(12) United States Patent
Li et al.

(10) Patent No.: US 10,623,582 B2
(45) Date of Patent: Apr. 14, 2020

(54) SWITCH DEVICE FOR USE IN GATEWAY EQUIPMENT AND GATEWAY EQUIPMENT

(71) Applicant: THOMSON Licensing, Issy-les-Moulineaux (FR)

(72) Inventors: Qi Li, Beijing (CN); Wei He, Beijing (CN); Ai hua Sun, Beijing (CN)

(73) Assignee: InterDigital CE Patent Holdings, SAS, Paris (FR)

( * ) Notice: Subject to any disclaimer, the term of this patent is extended or adjusted under 35 U.S.C. 154(b) by 159 days.

(21) Appl. No.: 15/741,221

(22) PCT Filed: Jun. 30, 2015

(86) PCT No.: PCT/CN2015/082831
§ 371 (c)(1),
(2) Date: Dec. 29, 2017

(87) PCT Pub. No.: WO2017/000220
PCT Pub. Date: Jan. 5, 2017

(65) Prior Publication Data
US 2018/0198921 A1     Jul. 12, 2018

(51) Int. Cl.
*H04M 3/00*     (2006.01)
*H04M 7/12*     (2006.01)
(Continued)

(52) U.S. Cl.
CPC ............ *H04M 7/125* (2013.01); *H04L 12/66* (2013.01); *H04L 29/06224* (2013.01);
(Continued)

(58) Field of Classification Search
CPC .......... H04M 7/125; H04M 3/12; H04M 3/24; H04M 7/0069; H04M 7/121; H04L 12/66; H04L 29/06224; H04L 65/102
(Continued)

(56) References Cited

U.S. PATENT DOCUMENTS 8,666,057 B2   3/2014   Cooke et al.
8,674,546 B1   3/2014   Dix et al.
(Continued)

FOREIGN PATENT DOCUMENTS

CN   1656785   8/2005
CN   1805451   7/2006
(Continued)

OTHER PUBLICATIONS

Mendelson, G., "All You Need to Know About Power over Ethernet (PoE) and the IEEE 802.3af Standard", PowerDsine Ltd., White Paper, Jun. 2004, pp. 1-24.

*Primary Examiner* — Md S Elahee
(74) *Attorney, Agent, or Firm* — Invention Mine LLC (57) ABSTRACT

A switch device for use in a gateway equipment and a gateway equipment comprising the switch device are suggested. The suggested switch comprises a Foreign Exchange Station (FXS) port configured to be connected to a telephone set, a Foreign Exchange Office (FXO) port connected to communicate analog voice signals with an external network, and a Voice over Internet Protocol (VOIP) unit configured to communicate digital data signals with the external network and enable a VOIP call using the digital data signals. The switch device comprises a switch configured to, when the gateway equipment is power down, connect the FXS port to the FXO port. The switch device also comprises a power unit configured to generate a work voltage from the analog voice signals at the FXO port to provide a power supply to the switch.

24 Claims, 4 Drawing Sheets

(51) Int. Cl.
*H04L 12/66* (2006.01)
*H04M 3/24* (2006.01)
*H04M 3/12* (2006.01)
*H04M 7/00* (2006.01)
*H04L 29/06* (2006.01)

(52) U.S. Cl.
CPC ............ *H04L 65/102* (2013.01); *H04M 3/12* (2013.01); *H04M 3/24* (2013.01); *H04M 7/0069* (2013.01); *H04M 7/121* (2013.01); *H04M 7/006* (2013.01); *H04M 7/0057* (2013.01)

(58) Field of Classification Search
USPC .................................. 379/322–324; 370/352
See application file for complete search history.

(56) References Cited

U.S. PATENT DOCUMENTS

| | | |
|---|---|---|
| 2001/0046237 A1 | 11/2001 | Chan et al. |
| 2003/0086559 A1 | 5/2003 | Chen et al. |
| 2007/0165611 A1 | 7/2007 | Yang et al. |
| 2007/0280288 A1 | 12/2007 | Ma |
| 2014/0084681 A1 | 3/2014 | Vigna et al. |

FOREIGN PATENT DOCUMENTS

| | | |
|---|---|---|
| CN | 101068184 | 11/2007 |
| EP | 1511282 | 3/2005 |

SWITCH DEVICE FOR USE IN GATEWAY EQUIPMENT AND GATEWAY EQUIPMENT

This application claims the benefit, under 35 U.S.C. § 365 of International Application PCT/CN2015/082831, filed on Jun. 30, 2015, which was published in accordance with PCT Article 21(2) on Jan. 5, 2017, in English.

TECHNICAL FIELD

The present disclosure generally relates to the technical field of telecommunication, and particularly to a switch device for use in a gateway equipment and the gateway equipment.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

The Voice over Internet Protocol (VOIP) technology is a communication technology that enables voice calls using digital data signals. At a user's gateway equipment, the data signals are used by a VOIP unit to provide a VOIP call to the user. The data signals may be transferred through a separate IP network or in combination with analog voice signals through an existing telephone network, such as the Public Switched Telephone Network (PSTN). The PSTN transfers the analog voice signals using a low frequency band of a PSTN cable and digital data signals using a high frequency band of the cable. At the user's end, the low-band and high-band signals are separated by a splitter into the voice signals and the data signals, which are fed to the gateway equipment to provide a conventional telephone call and the VOIP call, respectively.

Figure 1:
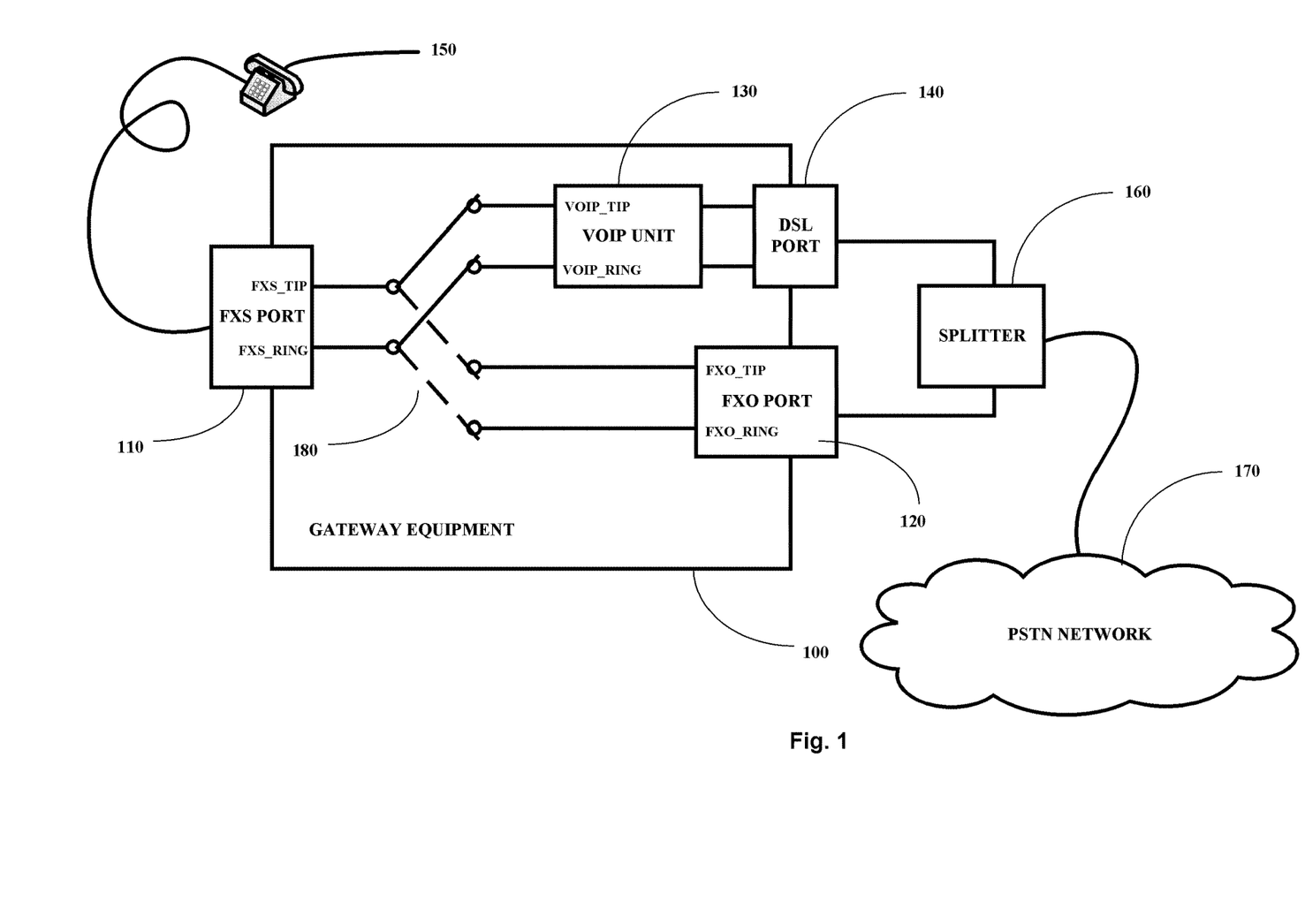
FIG. 1 is a block diagram schematically showing a gateway equipment 100 and its connection to a PSTN network and a user's telephone set.

FIG. 1 schematically shows a gateway equipment 100 and its connection to a PSTN network and a user's telephone set. As shown in the figure, the gateway equipment 100 comprises a Foreign Exchange Station (FXS) port 110, a Foreign Exchange Office (FXO) port 120, a VOIP unit 130, and a Digital Subscriber Line (DSL) port 140. The FXS port 110 is configured to be connected to the telephone set 150. The FXO port 120 and the DSL port 140 are configured to be connected to a splitter 150, which is configured to separate signals from the PSTN network 170 into low-band voice signals and high-band data signals and feed them into the FXO port 120 and the DSL port 140, respectively. The VOIP unit 130 is configured to enable a VOIP call using the data signals from the DSL port 140. The gateway equipment 100 also comprises a switch device 180 configured to switch between a connection between the FXS port 110 and the FXO port 120 and a connection between the FXS port 110 and the VOIP unit 130. The switch device 180 connects the FXS port 110 to the VOIP unit 130 to enable the VOIP call when the gateway equipment 100 is power on. However, when the gateway equipment 100 is power down due to, e.g., the user manually turning off the gateway equipment 100 or accidental blackout of electricity system, the switch device 180 switches to the connection between the FXS port 110 and the FXO port 120. In this way, the uncompleted VOIP call can be continued by the conventional telephone call using the voice signals from the FXO port 120.

It should be noted that, in case where the data signals are provided from a separate IP network, the splitter 160 can be omitted so that the FXO port 120 communicates with the PSTN network while the DSL port 140 communicates with the IP network.

Figure 2:
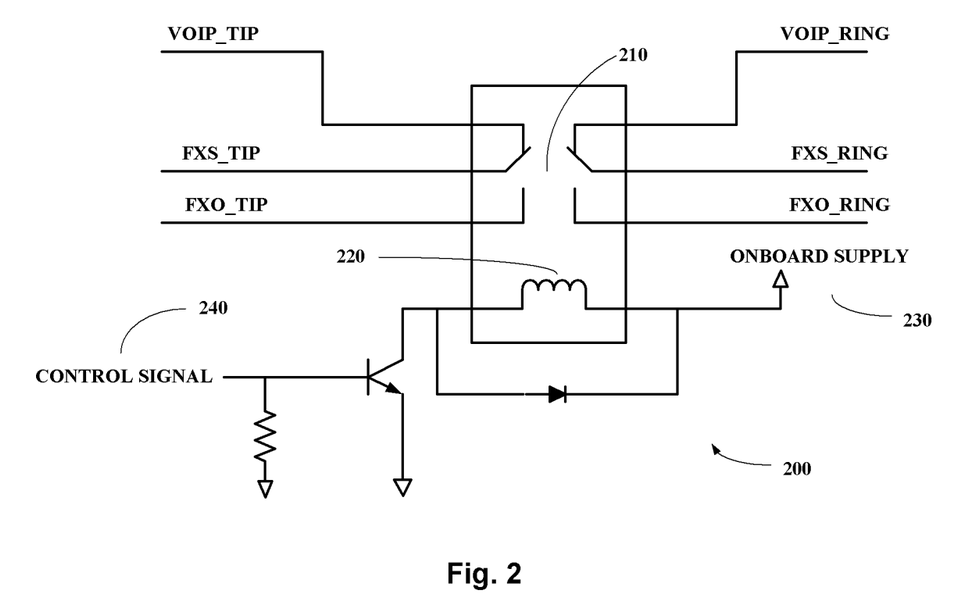
FIG. 2 schematically shows a typical structure of an electromagnetic switch device for use in the gateway equipment as shown in FIG. 1.

FIG. 2 schematically shows a typical structure of an electromagnetic switch device 200 for use as the above-described switch device 180. As shown in the figure, the switch device 200 comprises a switch 210 and an inductive coil 220, which is actuated by an onboard supply 230 under control of a control signal 240. The control signal 240 may be provided from a control unit (not shown), e.g., a CPU of the gateway equipment 100. When the gateway equipment 100 is power on, current runs through the coil 220 so that the switch 210 is pushed up to connect the FXS port 110 to the VOIP unit 130 by connecting a TIP pin FXS_TIP and a Ring pin FXS_RING of the FXS port 110 to a TIP pin VOIP_TIP and a Ring pin VOIP_RING of the VOIP unit 130, respectively. Thus, a VOIP call is enabled using the digital data signals. When the gateway equipment 100 is power down, the switch 210 falls down under the effect of gravity to connect the TIP pin FXS_TIP and the Ring pin FXS_RING of the FXS port 110 to a TIP pin FXO_TIP and a Ring pin FXO_RING of the FXO port 120, respectively. In this way, the call can be continued using the voice signals from the FXO port 120.

As the switch device switches mechanically between the VOIP unit and the FXO port, there may be audible noise and the lifetime of the switch device may be limited. Furthermore, there is a relatively strict requirement on mechanical contacting stability of the switch device to ensure a high-quality communication, which may result in high manufacture cost thereof. Moreover, the electromagnetic switch is typically large in size, causing a large dimension and a complex layout of the gateway equipment.

SUMMARY

According to a first aspect of the present disclosure, there is provided a switch device for use in a gateway equipment, which comprises a Foreign Exchange Station (FXS) port configured to be connected to a telephone set, a Foreign Exchange Office (FXO) port connected to communicate analog voice signals with an external network, and a Voice over Internet Protocol (VOIP) unit configured to communicate digital data signals with the external network and enable a VOIP call using the digital data signals. The switch device comprises a switch configured to, when the gateway equipment is power down, connect the FXS port to the FXO port. The switch device further comprises a power unit configured to generate a work voltage from the analog voice signals at the FXO port to provide a power supply to the switch.

In an embodiment, the switch may be further configured to connect the VOIP unit to the FXS port when the gateway equipment is power on.

In an embodiment, the power unit may comprise a bridge circuit comprising a first, a second, a third, and a fourth diodes connected in a loop. The power unit may further comprise an energy storage capacitor. A first node, where an anode of the first diode and a cathode of the second diode are connected, may be connected to a TIP pin FXO_TIP of the FXO port. A third node, where a cathode of the third diode and an anode of the fourth diode are connected, may be connected to a RING pin FXO_RING of the FXO port. A second node, where respective anodes of the second and third diodes are connected, and a fourth node, where respective cathodes of the first and fourth diodes are connected, may be connected to opposite ends of the energy storage capacitor, respectively. A voltage across the energy storage capacitor is output as the work voltage.

In an embodiment, the switch may comprise a first switch unit configured to be connected between the FXS port and the VOIP unit, which switches on only when the gateway equipment is power on. The switch may further comprise a second switch unit configured to be connected between the FXS port and the FXO port, which switches on only when the gateway equipment is power down.

In an embodiment, the first switch unit may comprise a first transistor having source/drain electrodes configured to be connected to a TIP pin of the FXS port and a TIP pin of the VOIP unit, respectively. The first switch unit may further comprise a second transistor having source/drain electrodes configured to be connected to a Ring pin of the FXS port and a Ring pin of the VOIP unit, respectively. The first and second transistors each may have a gate electrode connected to an onboard voltage of the gateway equipment via a control transistor and to ground via a first grounded resistor. The control transistor may selectively switch on or off depending on a control signal from a control unit of the gateway equipment to selectively connect the respective gates of the first and second transistors to the onboard voltage or ground.

In an embodiment, the control signal may switch on the control transistor to connect the respective gates of the first and second transistors to the onboard voltage when the gateway equipment is power on, causing the first and second transistors to switch on to connect the TIP and Ring pins of the FXS port to the TIP and Ring pins of the VOIP unit, respectively. The control signal may switch off the control transistor to disconnect the respective gates of the first and second transistors from the onboard voltage when the gateway equipment is power down, causing the first and second transistors to switch off to disconnect the TIP and Ring pins of the FXS port from the TIP and Ring pins of the VOIP unit, respectively.

In an embodiment, the first and second transistors may be NMOS transistors.

In an embodiment, the switch device may further comprises, for each of the first and second transistors, a resistor and a capacitor connected in parallel between the gate and one of the source/drain electrodes of the transistor.

In an embodiment, the second switch unit may comprise a third transistor having source/drain electrodes configured to be connected between a TIP pin of the FXS port and a TIP pin of the FXO port. The second switch unit may further comprise a fourth transistor having source/drain electrodes configured to be connected between a Ring pin of the FXS port and a Ring pin of the FXO. The third and fourth transistors each may have a gate electrode connected to an output of a gate logic unit. The gate logic unit may be powered by the work voltage and switches on or off the third and fourth transistors depending on whether the gateway equipment is power on or down.

In an embodiment, the gate logic unit may be an NAND gate with an input connected between an onboard voltage of the gateway equipment and ground and another input connected between a control signal from a control unit of the gateway equipment and the ground. The gate logic unit may switch on the third and fourth transistors to connect the TIP and Ring pins of the FXS port to the TIP and Ring pins of the FXO port, respectively, when the gateway equipment is power down. The gate logic unit may switch off the third and fourth transistors to disconnect the TIP and Ring pins of the FXS port from the TIP and Ring pins of the FXO port, respectively, when the gateway equipment is power on.

In an embodiment, the NAND gate may output a low level when the gateway equipment is power on and a high level when the gateway equipment is power down. The third and fourth transistors may be NMOS transistors.

In an embodiment, the switch device may further comprise, for each of the third and fourth transistors, a resistor and a capacitor connected in parallel between the gate and one of the source/drain electrodes of the transistor.

According to a second aspect of the present disclosure, there is provided a gateway equipment. The gateway equipment comprises a Foreign Exchange Station (FXS) port configured to be connected to a telephone set, a Foreign Exchange Office (FXO) port connected to an external network and configured to transfer analog voice signals, and a VOIP unit connected to the external network and configured to enable a Voice over Internet Protocol (VOIP) call using digital signals. The gateway equipment further comprises a switch device as described above.

BRIEF DESCRIPTION OF THE DRAWINGS

The above and other objects, features, and advantages of the present disclosure will become apparent from the following descriptions on embodiments of the present disclosure with reference to the drawings, in which.

In the drawings, similar or same steps and/or elements are designated with similar or same referential numbers.

DETAILED DESCRIPTION OF EMBODIMENTS

In the discussion that follows, specific details of particular embodiments of the present techniques are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not obscure the description with unnecessary detail. Throughout the specification, the expression "A is connected to/with B" or the like does not necessarily mean A is directly connected to B. Instead, there may be one or more intermediate elements between A and B.

Figure 3:
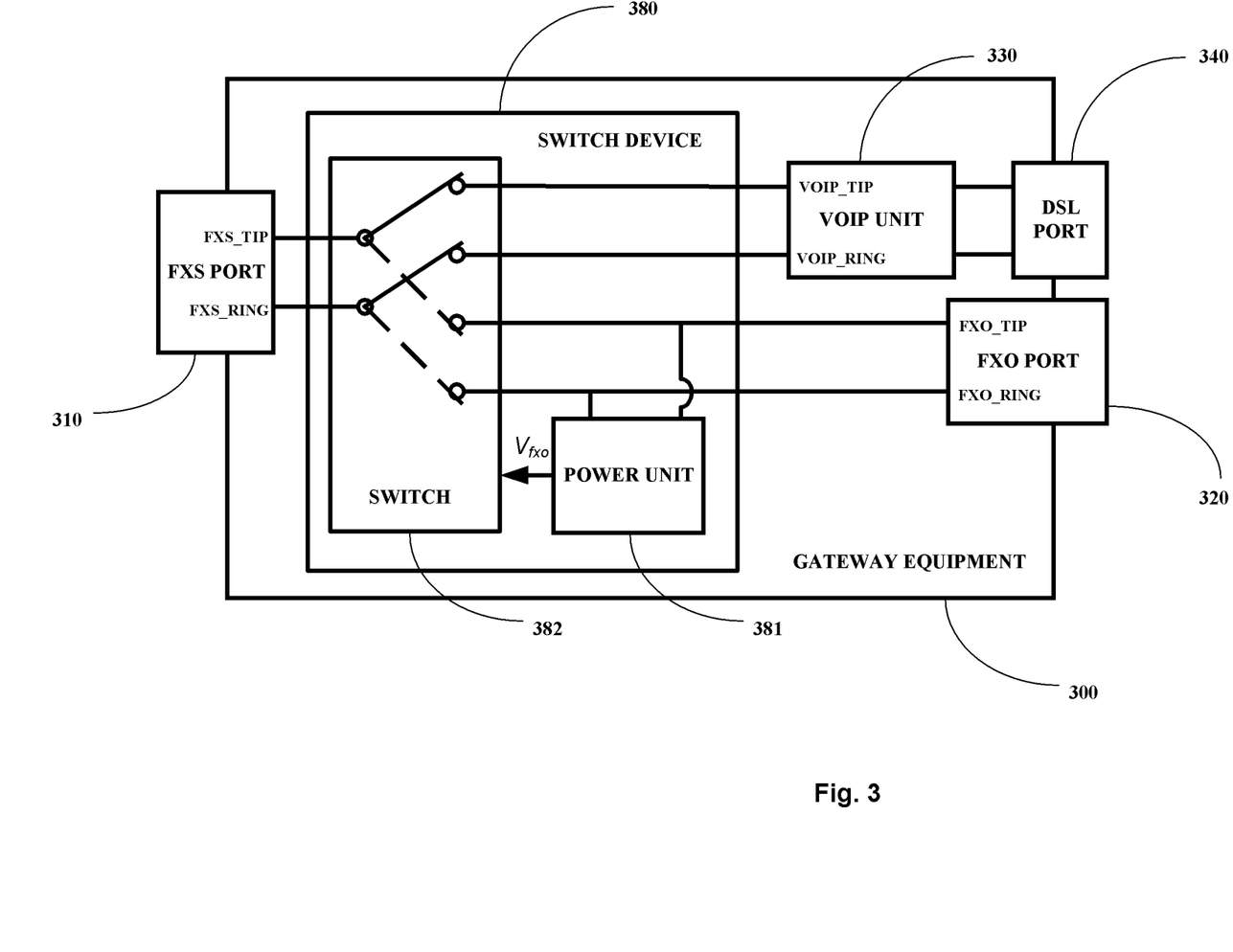
FIG. 3 is a diaphragm schematically showing a gateway device according to an embodiment of the present disclosure.

FIG. 3 is a diaphragm schematically showing a gateway device 300 according to an embodiment of the present disclosure. As shown in the figure, the gateway device 300 comprises an FXS port 310, an FXO port 320, a VOIP unit 330, and a DSL port 340. The FXS port 310, FXO port 320, VOIP unit 330, and DSL port 340 are substantially the same as the FXS port 110, FXO port 120, VoIP unit 130, and DSL port 140 as described above with reference to FIG. 1, and thus detailed explanation thereof is omitted here.

The gateway device 300 also comprises a switch device 380. The switch device 380 comprises a power unit 381 and a switch 382. The power unit 381 is connected to the FXO port 320 to generate a work voltage $V_{fxo}$ for the switch 382.

As described above, the FXO port 320 is used to transfer the voice signals and thus can provides a continuous power supply. Thus, the work voltage $V_{fxo}$ exists even when the gateway equipment 300 is power down. The switch 382 comprises a first switch 382_1 and a second switch unit 382_2. The first switch unit 382_1 switches on to connect the FXS port 310 to the VoIP unit 330 by connecting a TIP pin FXS_TIP and a RING pin FXS_RING of the FXS port 310 to a TIP pin VOIP_TIP and a RING pin VOIP_RING of the VoIP unit 330, respectively, when the gateway 300 is power on. Meanwhile, the second switch unit 382_2 switches off so that the FXS port 310 is disconnected from the FXO port 320. The second switch unit 382_2 switches on to connect the FXS port 310 to the FXO port 320 by connecting the TIP pin FXS_TIP and the RING pin FXS_RING of the FXS port 310 to a TIP pin FXO_TIP and a RING pin FXO_RING of the FXO port 320, respectively, when the gateway equipment 300 is power down. Meanwhile, the first switch unit 382_1 switches off to disconnect the FXS port 310 from the VOIP unit 330. In this way, there is one, and only one of the VOIP unit 330 and the FXO port 320 is connected to the FXS port 310 at one time so that no conflict occurs between the VOIP call and the conventional voice call. Also, the VOIP call can be immediately switched to the conventional voice call when the gateway equipment 300 is power down so that the uncompleted communication can be continued smoothly.

The switch device 380 according to the present disclosure is an electronic device and thus does not have the above-described problems, such as audible noise, limited life time, vulnerable contacting stability, large layout, or the like, related to the electromagnetic switch. To the contrary, the switch device 380 is capable of smooth switching between the VOIP call and the conventional voice call and reliable connection. Also, the switch device 380 may have a long lifetime and small size. Accordingly, the performance of the gateway equipment 300 can be greatly improved.

Figure 4:
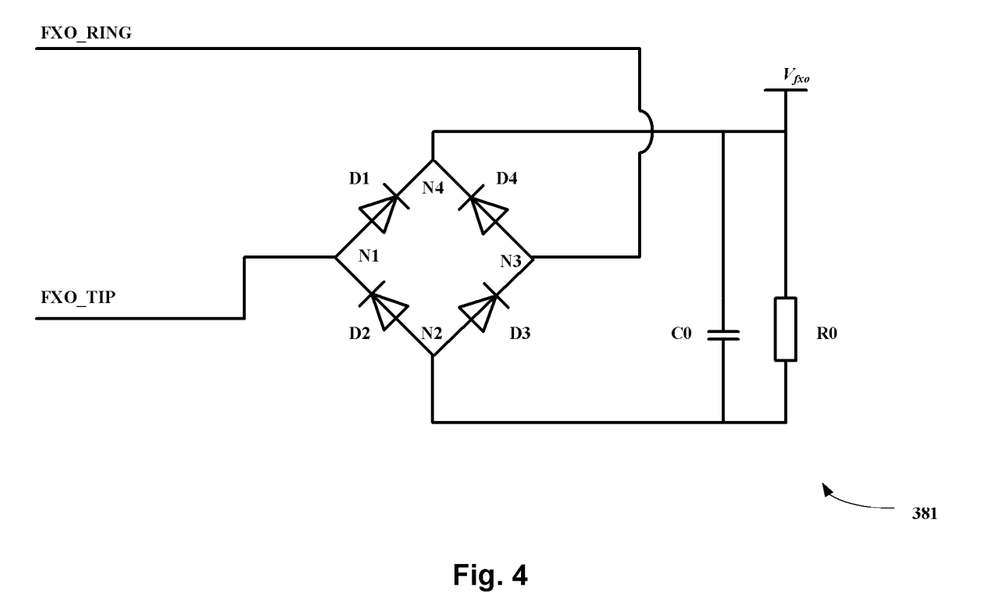
FIG. 4 schematically shows a power unit in the switch device according to an embodiment of the present disclosure.

FIG. 4 schematically shows an exemplary circuit for the power unit 381 according to an embodiment of the present disclosure. As shown in FIG. 4, the power unit 381 comprises a bridge circuit connected to the TIP pin FXO_TIP and the RING pin FXO_RING of the FXO port 320 to generate the work voltage $V_{fxo}$. The bridge circuit comprises a first, a second, a third, and a fourth diodes D1, D2, D3, and D4, which are connected in a loop with adjacent diodes are connected in opposite directions. In an embodiment, an anode of the first diode D1 and a cathode of the second diode D2 are connected at a first node N1. An anode of the second diode D2 and an anode of the third diode D3 are connected at a second node N2. A cathode of the third diode D3 and an anode of the fourth diode D4 are connected at a third node N3. A cathode of the fourth diode D4 and a cathode of the first diode D1 are connected at a fourth node N4. The first and third nodes N1 and N3 are connected to the TIP pin FXO_TIP and the RING pin FXO_RING of the FXO port 320, respectively, to receive power input from the FXO port 320. An energy storage capacitor C0 is connected across the second and fourth nodes N2 and N4 to generate the work voltage work voltage $V_{fxo}$. In an embodiment of the present disclosure, the power unit 381 may further comprise a stabilizing resistor R0 to stabilize a DC level of the work voltage $V_{fxo}$. The stabilizing resistor R0 may have a sufficiently large resistance, e.g., 1 Mohm. In an embodiment of the present disclosure, the voltage provided from the FXO port 320 is in a range from −90V to −9V and the work voltage $V_{fxo}$ generated by the power unit 381 is in a range from 9V to 90V.

Figure 5:
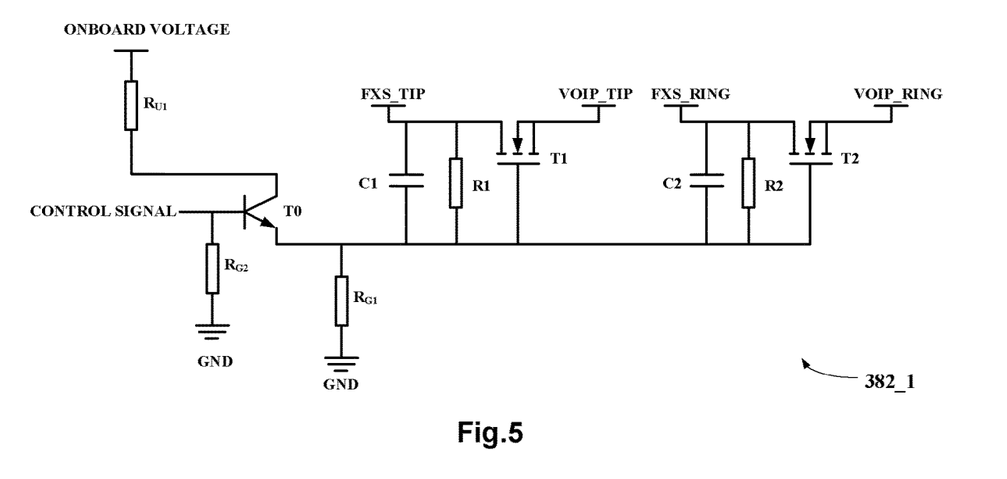
FIG. 5 schematically shows a first switch unit in the switch device according to an embodiment of the present disclosure.

FIG. 5 schematically shows the first switch unit 382_1 of the switch 382 according to an embodiment of the present disclosure. As shown in FIG. 5, the first switch unit 382_1 comprises a first transistor T1 and a second transistor T2. In an embodiment, the first and second transistors T1 and T2 are NMOS transistors. The first transistor T1 has source/drain electrodes connected to the TIP pin FXS_TIP of the FXS port 310 and the TIP pin VOIP_TIP of the VOIP unit 330, respectively. The second transistor T2 has source/drain electrodes connected to the Ring pin of the FXS port FXS_RING and the Ring pin VOIP_RING of the VOIP unit, respectively. The first and second transistors T1 and T2 each have a gate electrode connected to an onboard voltage of the gateway equipment 300 via a control transistor T0 and to ground via a first grounded resistor $R_{G1}$. In an embodiment of the present disclosure, the control transistor T0 is a bipolar transistor. A base electrode of the control transistor T0 receives a control signal from a control unit (not shown) of the gateway device 300. In an embodiment, the control unit may be a CPU of the gateway device 300. The base electrode of the control transistor T0 is also connected to ground via a second grounded resistor $R_{G2}$. A collector electrode of the control transistor T0 is connected to the onboard voltage via a first pull-up transistor $R_{U1}$. An emitter electrode of the control transistor T0 is connected to the respective gate electrodes of the first and second transistors T1 and T2.

In an embodiment of the present disclosure, the control transistor T0 selectively switches on or off depending on the control signal. When the gateway device 300 is power on, the control signal is at a high level to switch on the control transistor T0. Thus, the respective gate electrodes of the first and second transistors T1 and T2 are connected to the onboard voltage, which is also at a high level. As a result, the first and second transistors T1 and T2 switch on to connect the TIP pin FXS_TIP and the RING pin FXS_RING of the FXS port 310 to the TIP pin VOIP_TIP and the RING pin VOIP_RING of the VOIP unit 330, respectively. Thus, the FXS port 310 is connected to the VOIP unit 330 to enable the VOIP call. On the other hand, when the gateway device 300 is power down, the control signal is at a low level to switch off the control transistor T0. Thus, the respective gate electrodes of the first and second transistors T1 and T2 are connected to the ground. As a result, the first and second transistors T1 and T2 switch off to disconnect the TIP pin FXS_TIP and the RING pin FXS_RING of the FXS port 310 from the TIP pin VOIP_TIP and the RING pin VOIP_RING of the VOIP unit 330, respectively. Thus, the FXS port 310 is disconnected from the VOIP unit 330 to disable the VOIP call. In this way, the first switch unit 382_1 switches on to connect the FXS port 310 to the VoIP unit 330 when the gateway 300 is power on and switches off to disconnect the FXS port 310 from the VOIP unit 330 when the gateway device 300 is power down.

In an embodiment of the present disclosure, the first switch unit 382_1 may further comprise, for each of the first and second transistors T1/T2, a resistor R1/R2 and a capacitor C1/C2 connected in parallel between the gate electrode and one of the source/drain electrodes of the transistor T1/T2. The resistor R1/R2 and the first grounded resistor $R_{G1}$ constitute a voltage divider to set a DC level for the transistor T1/T2. The capacitor C1/C2 is configured to control the gate switching of the transistor T1/T2 to prevent damage of the transistor T1/T2 due to fast switching.

Figure 6:
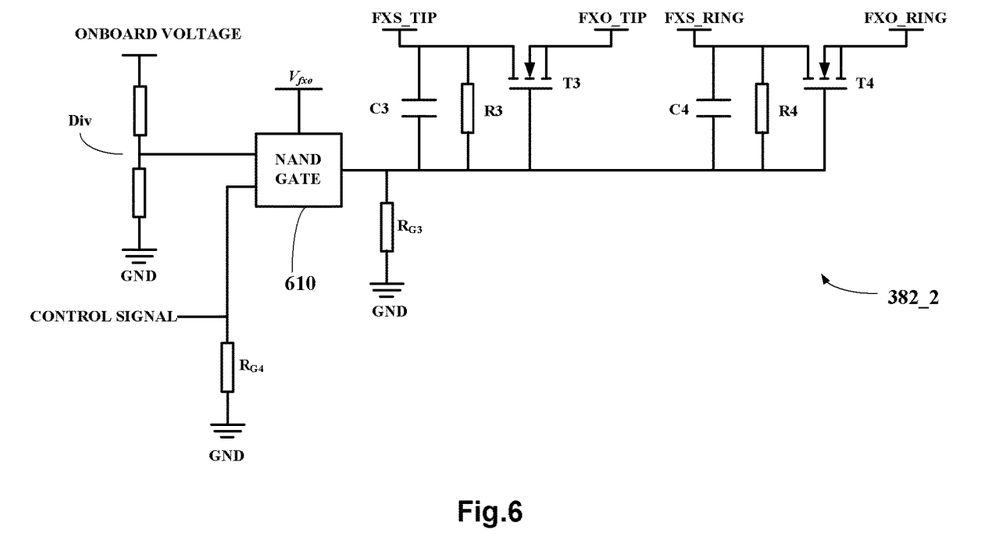
FIG. 6 schematically shows a second switch unit in the switch device according to an embodiment of the present disclosure.

FIG. 6 schematically shows the second switch unit 382_2 of the switch 382 according to an embodiment of the present disclosure. As shown in FIG. 6, the second switch unit 382_2 comprises a third transistor T3 and a fourth transistor T4. In an embodiment, the third and fourth transistors T3 and T4 are NMOS transistors. The third transistor T3 has source/drain electrodes connected to the TIP pin FXS_TIP of the FXS port 310 and the TIP pin FXO_TIP of the FXO port 320, respectively. The fourth transistor T4 has source/drain electrodes connected to the Ring pin of the FXS port FXS_RING and the Ring pin FXO_RING of the FXO port 320, respectively. The third and fourth transistors T3 and T4 each have a gate electrode connected to an output of a gate logic unit 610 and to ground via a third grounded resistor $R_{G3}$. In an embodiment of the present disclosure, the gate logic unit 610 is an NAND gate logic. The gate logic unit 610 is powered by the work voltage $V_{fxo}$. An input of the gate logic unit 610 is connected between the onboard voltage and the ground. In an embodiment of the present disclosure, the input of the gate logic unit 610 is connected to an intermediate node of a voltage divider connected between the onboard voltage and the ground. Another input of the gate logic unit 610 is connected to a control signal from a control unit of the gateway device 300 and also to the ground via a fourth grounded resistor $R_{G4}$. In an embodiment of the present disclosure, the control unit may be the CPU of the gateway device 300. This control signal for the second switch unit 382_2 may be the same as or different from the control signal for the first switch unit 382_1.

In an embodiment of the present disclosure, the gate logic unit 610 selectively outputs a high or low level depending on its inputs. When the gateway device 300 is power on, both the onboard voltage and the control signal are at a high level so that the gate logic unit 610 outputs a low level. As a result, the third and fourth transistors T3 and T4 switch off to disconnect the TIP pin FXS_TIP and the RING pin FXS_RING of the FXS port 310 from the TIP pin FXO_TIP and the RING pin FXO_RING of the FXO port 320, respectively. Thus, the FXS port 310 is disconnected from the FXO port 320 to disable the conventional voice call. On the other hand, when the gateway device 300 is power down, both the inputs of the gate logic unit 610 are grounded so that it outputs a high level. As a result, the third and fourth transistors T3 and T4 switch on to connect the TIP pin FXS_TIP and the RING pin FXS_RING of the FXS port 310 to the TIP pin FXO_TIP and the RING pin FXO_RING of the FXO port 320, respectively. Thus, the FXS port 310 is connected to the FXO port 320 to enable the conventional voice call. In this way, the second switch unit 382_2 switches off to disconnect the FXS port 310 from the FXO port 320 when the gateway 300 is power on and switches on to connect the FXS port 310 to the FXO port 320 when the gateway device 300 is power down.

In an embodiment of the present disclosure, the second switch unit 382_2 may further comprise, for each of the third and fourth transistors T3/T4, a resistor R3/R4 and a capacitor C3/C4 connected in parallel between the gate electrode and one of the source/drain electrodes of the transistor T3/T4. The resistor R3/R4 and the third grounded resistor $R_{G4}$ constitute a voltage divider to set a DC level for the transistor T3/T4. The capacitor C3/C4 is configured to control the gate switching of the transistor T3/T4 to prevent damage of the transistor T3/T4 due to fast switching.

As described above, the first switch unit 382_1 switches on to connect the FXS port 310 to the VoIP unit 330 when the gateway 300 is power on and switches off to disconnect the FXS port 310 from the VOIP unit 330 when the gateway device 300 is power down. To the contrary, the second switch unit 382_2 switches off to disconnect the FXS port 310 from the FXO port 320 when the gateway 300 is power on and switches on to connect the FXS port 310 to the FXO port 320 when the gateway device 300 is power down. Thus, there is one and only one of the VOIP call and the conventional voice call provided to the user at one time and thus no interference occurs during communication. Moreover, the VOIP call may be switched to the conventional voice call smoothly when the gateway device 300 is power down, which ensures the communication to be continued without interruption.

It should be note that, although the present disclosure is explained in the context of PSTN network, the principle thereof can be applied to various network environments where the VOIP call and the conventional voice call are provided to the user simultaneously. For example, the conventional voice call may be provided by the PSTN network while the VOIP call is provided by a separate IP network.

Although the present technology has been described above with reference to specific embodiments, it is not intended to be limited to the specific form set forth herein. The technology is limited only by the accompanying claims and other embodiments than the specific above are equally possible within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The present disclosure has been described above with reference to embodiments thereof. It should be understood that various modifications, alternations and additions can be made by those skilled in the art without departing from the spirits and scope of the present disclosure. Therefore, the scope of the present disclosure is not limited to the above particular embodiments but only defined by the claims as attached.

The invention claimed is:

1. A switch device for use in a gateway equipment, which comprises a Foreign Exchange Station (FXS) port configured to be connected to a telephone set, a Foreign Exchange Office (FXO) port connected to communicate analog voice signals with an external network, and a Voice over Internet Protocol (VOIP) unit configured to communicate digital data signals with the external network and enable a VOIP call using the digital data signals, the switch device comprising:
    a switch configured to, when the gateway equipment is powered down, connect the FXS port to the FXO port; and
    a power unit configured to generate a work voltage from the analog voice signals at the FXO port to provide a power supply to the switch.

2. The switch device according to claim 1, wherein the switch is further configured to connect the VOIP unit to the FXS port when the gateway equipment is powered on.

3. The switch device according to claim 1, wherein the power unit comprises:
   a bridge circuit comprising a first diode, a second diode, a third diode, and a fourth diode connected in a loop; and
   an energy storage capacitor,
   wherein:
   a first node, where an anode of the first diode and a cathode of the second diode are connected, is connected to a TIP pin FXO_TIP of the FXO port;
   a third node, where a cathode of the third diode and an anode of the fourth diode are connected, is connected to a RING pin FXO_RING of the FXO port;
   a second node, where respective anodes of the second and third diodes are connected, and a fourth node, where respective cathodes of the first and fourth diodes are connected, are connected to opposite ends of the energy storage capacitor, respectively; and
   a voltage across the energy storage capacitor is output as the work voltage.

4. The switch device according to claim 1, wherein the switch comprises:
   a first switch unit configured to be connected between the FXS port and the VOIP unit, which switches on only when the gateway equipment is powered on; and
   a second switch unit configured to be connected between the FXS port and the FXO port, which switches on only when the gateway equipment is powered down.

5. The switch device according to claim 4, wherein the first switch unit comprises:
   a first transistor having source/drain electrodes configured to be connected to a TIP pin of the FXS port and a TIP pin of the VOIP unit, respectively; and
   a second transistor having source/drain electrodes configured to be connected to a Ring pin of the FXS port and a Ring pin of the VOIP unit, respectively,
   wherein:
   the first and second transistors each have a gate electrode connected to an onboard voltage of the gateway equipment via a control transistor and to ground via a first grounded resistor; and
   the control transistor selectively switches on or off depending on a control signal from a control unit of the gateway equipment to selectively connect the respective gates of the first and second transistors to the onboard voltage or ground.

6. The switch device according to claim 5, wherein:
   the control signal switches on the control transistor to connect the respective gates of the first and second transistors to the onboard voltage when the gateway equipment is powered on, causing the first and second transistors to switch on to connect the TIP and Ring pins of the FXS port to the TIP and Ring pins of the VOIP unit, respectively; and
   the control signal switches off the control transistor to disconnect the respective gates of the first and second transistors from the onboard voltage when the gateway equipment is powered down, causing the first and second transistors to switch off to disconnect the TIP and Ring pins of the FXS port from the TIP and Ring pins of the VOIP unit, respectively.

7. The switch device according to claim 5, wherein the first and second transistors are NMOS transistors.

8. The switch device according to claim 5, further comprising, for each of the first and second transistors, a resistor and a capacitor connected in parallel between the gate and one of the source/drain electrodes of the transistor.

9. The switch device according to claim 4, wherein the second switch unit comprises:
   a third transistor having source/drain electrodes configured to be connected between a TIP pin of the FXS port and a TIP pin of the FXO port; and
   a fourth transistor having source/drain electrodes configured to be connected between a Ring pin of the FXS port and a Ring pin of the FXO,
   wherein:
   the third and fourth transistors each have a gate electrode connected to an output of a gate logic unit;
   the gate logic unit is powered by the work voltage and switches on or off the third and fourth transistors depending on whether the gateway equipment is powered on or powered down.

10. The switch device according to claim 8, wherein:
    the gate logic unit is an NAND gate with an input connected between an onboard voltage of the gateway equipment and ground and another input connected between a control signal from a control unit of the gateway equipment and the ground;
    the gate logic unit switches on the third and fourth transistors to connect the TIP and Ring pins of the FXS port to the TIP and Ring pins of the FXO port, respectively, when the gateway equipment is powered down; and
    the gate logic unit switches off the third and fourth transistors to disconnect the TIP and Ring pins of the FXS port from the TIP and Ring pins of the FXO port, respectively, when the gateway equipment is powered on.

11. The switch device according to claim 10, wherein:
    the NAND gate outputs a low level when the gateway equipment is powered on and a high level when the gateway equipment is powered down; and
    the third and fourth transistors are NMOS transistors.

12. The switch device according to claim 9, further comprising, for each of the third and fourth transistors, a resistor and a capacitor connected in parallel between the gate and one of the source/drain electrodes of the transistor.

13. A gateway equipment, comprising:
    the Foreign Exchange Station (FXS) port configured to be connected to a telephone set;
    the Foreign Exchange Office (FXO) port connected to an external network and configured to transfer analog voice signals;
    the VOIP unit connected to the external network and configured to enable a Voice over Internet Protocol (VOIP) call using digital signals; and
    the switch device according to claim 1.

14. The gateway equipment according to claim 13, wherein the switch is further configured to connect the VOIP unit to the FXS port when the gateway equipment is powered on.

15. The gateway equipment according to claim 13, wherein the power unit comprises:
    a bridge circuit comprising a first diode, a second diode, a third diode, and a fourth diode connected in a loop; and
    an energy storage capacitor,
    wherein:
    a first node, where an anode of the first diode and a cathode of the second diode are connected, is connected to a TIP pin FXO_TIP of the FXO port;
    a third node, a cathode of the third diode and an anode of the fourth diode are connected, is connected to a RING pin FXO_RING of the FXO port;

a second node, where respective anodes of the second and third diodes are connected, and a fourth node, where respective cathodes of the first and fourth diodes are connected, are connected to opposite ends of the energy storage capacitor, respectively; and a voltage across the energy storage capacitor is output as the work voltage.

16. The gateway equipment according to claim 13, wherein the switch comprises:
a first switch unit configured to be connected between the FXS port and the VOIP unit, which switches on only when the gateway equipment is powered on; and
a second switch unit configured to be connected between the FXS port and the FXO port, which switches on only when the gateway equipment is powered down.

17. The gateway equipment according to claim 16, wherein the first switch unit comprises:
a first transistor having source/drain electrodes configured to be connected to a TIP pin of the FXS port and a TIP pin of the VOIP unit, respectively; and
a second transistor having source/drain electrodes configured to be connected to a Ring pin of the FXS port and a Ring pin of the VOIP unit, respectively,
wherein:
the first and second transistors each have a gate electrode connected to an onboard voltage of the gateway equipment via a control transistor and to ground via a first grounded resistor; and
the control transistor selectively switches on or off depending on a control signal from a control unit of the gateway equipment to selectively connect the respective gates of the first and second transistors to the onboard voltage or ground.

18. The gateway equipment according to claim 17, wherein:
the control signal switches on the control transistor to connect the respective gates of the first and second transistors to the onboard voltage when the gateway equipment is powered on, causing the first and second transistors to switch on to connect the TIP and Ring pins of the FXS port to the TIP and Ring pins of the VOIP unit, respectively; and
the control signal switches off the control transistor to disconnect the respective gates of the first and second transistors from the onboard voltage when the gateway equipment is powered down, causing the first and second transistors to switch off to disconnect the TIP and Ring pins of the FXS port from the TIP and Ring pins of the VOIP unit, respectively.

19. The gateway equipment according to claim 17, wherein the first and second transistors are NMOS transistors.

20. The gateway equipment according to claim 17, further comprising, for each of the first and second transistors, a resistor and a capacitor connected in parallel between the gate and one of the source/drain electrodes of the transistor.

21. The gateway equipment according to claim 16, wherein the second switch unit comprises:
a third transistor having source/drain electrodes configured to be connected between a TIP pin of the FXS port and a TIP pin of the FXO port; and
a fourth transistor having source/drain electrodes configured to be connected between a Ring pin of the FXS port and a Ring pin of the FXO,
wherein:
the third and fourth transistors each have a gate electrode connected to an output of a gate logic unit;
the gate logic unit is powered by the work voltage and switches on or off the third and fourth transistors depending on whether the gateway equipment is powered on or powered down.

22. The gateway equipment according to claim 20, wherein:
the gate logic unit is an NAND gate with an input connected between an onboard voltage of the gateway equipment and ground and another input connected between a control signal from a control unit of the gateway equipment and the ground;
the gate logic unit switches on the third and fourth transistors to connect the TIP and Ring pins of the FXS port to the TIP and Ring pins of the FXO port, respectively, when the gateway equipment is powered down; and
the gate logic unit switches off the third and fourth transistors to disconnect the TIP and Ring pins of the FXS port from the TIP and Ring pins of the FXO port, respectively, when the gateway equipment is powered on.

23. The gateway equipment according to claim 22, wherein:
the NAND gate outputs a low level when the gateway equipment is powered on and a high level when the gateway equipment is powered down; and
the third and fourth transistors are NMOS transistors.

24. The gateway equipment according to claim 21, further comprising, for each of the third and fourth transistors, a resistor and a capacitor connected in parallel between the gate and one of the source/drain electrodes of the transistor.

* * * * *

UNITED STATES PATENT AND TRADEMARK OFFICE
CERTIFICATE OF CORRECTION

| | | |
|---|---|---|
| PATENT NO. | : 10,623,582 B2 | |
| APPLICATION NO. | : 15/741221 | |
| DATED | : April 14, 2020 | |
| INVENTOR(S) | : Qi Li, Wei He and Ai hua Sun | |

It is certified that error appears in the above-identified patent and that said Letters Patent is hereby corrected as shown below:

In the Claims

Claim 10, Column 10, Line 16: Replace "8" with --9--;

Claim 22, Column 12, Line 22: Replace "20" with --21--.

Signed and Sealed this
Seventeenth Day of May, 2022

Katherine Kelly Vidal
*Director of the United States Patent and Trademark Office*